(12) United States Patent
Boucher et al.

(10) Patent No.: US 11,592,640 B2
(45) Date of Patent: Feb. 28, 2023

(54) WALLMOUNT ENCLOSURE FOR FIBER OPTIC CASSETTES

(71) Applicant: BELDEN CANADA ULC, Saint-Laurent (CA)

(72) Inventors: Jacques-Olivier Boucher, Saint-Laurent (CA); Christian Roa-Quispe, Laval (CA); Lucas Rakoto-Sam, Montreal (CA)

(73) Assignee: BELDEN CANADA ULC, Saint-Laurent (CA)

( * ) Notice: Subject to any disclaimer, the term of this patent is extended or adjusted under 35 U.S.C. 154(b) by 18 days.

(21) Appl. No.: 17/329,931

(22) Filed: May 25, 2021

(65) Prior Publication Data

US 2021/0364722 A1 Nov. 25, 2021

Related U.S. Application Data

(60) Provisional application No. 63/029,634, filed on May 25, 2020.

(51) Int. Cl.
*G02B 6/44* (2006.01)
*H02G 3/10* (2006.01)
(52) U.S. Cl.
CPC ............ *G02B 6/4455* (2013.01); *H02G 3/10* (2013.01)

(58) Field of Classification Search
None
See application file for complete search history.

(56) References Cited

U.S. PATENT DOCUMENTS

| | | | | |
|---|---|---|---|---|
| 5,187,766 A | * | 2/1993 | Finzel | G02B 6/4455 385/136 |
| 6,081,645 A | * | 6/2000 | Dotzer | G02B 6/4442 385/135 |
| 6,263,141 B1 | * | 7/2001 | Smith | G02B 6/4455 385/135 |
| 8,995,812 B2 | * | 3/2015 | Ciechomski | G02B 6/4452 385/139 |
| 2004/0120680 A1 | * | 6/2004 | Dillat | G02B 6/4455 385/135 |
| 2021/0364722 A1 | * | 11/2021 | Boucher | H02G 3/081 |

FOREIGN PATENT DOCUMENTS

FR 2757644 A1 * 6/1998 ........... G02B 6/4454

* cited by examiner

*Primary Examiner* — Rhonda S Peace
(74) *Attorney, Agent, or Firm* — Lavery, De Billy, LLP; Hugh Mansfield (57) ABSTRACT

A space saving wall mount enclosure for receiving a small number of optic fiber cassettes. The enclosure receives a rack which is rotatable about a rack axis between a first closed position wherein the cassettes are held within the enclosure and the enclosure door may be closed and a second open position where the rack is rotatable outwards allowing for the insertion or removal of the cassettes.

11 Claims, 13 Drawing Sheets

WALLMOUNT ENCLOSURE FOR FIBER OPTIC CASSETTES

FIELD OF THE INVENTION

The present invention relates to a wallmount enclosure for fiber optic cassettes.

BACKGROUND TO THE INVENTION

The prior art discloses cross connect systems comprising cases which are designed to be mounted in 19" racks or the like and which receive a large number of standardised fiber optic cassettes arranged side by side. The cassettes are typically inserted into the case from the front of the case and at right angles to the case, requiring at least a cassette's length of room in front of the case.

SUMMARY OF THE INVENTION

In order to address the above and other drawbacks there is provided a wallmount enclosure for receiving at least one fiber optic cassette. The enclosure comprises a housing comprising a cassette receiving space defined by a rear wall and a top wall, a bottom wall opposite the top wall and a pair of opposed sidewalls positioned between the top wall and the bottom wall, respective forwards edges of the top wall, bottom wall and sidewalls defining an opening to the cassette receiving space opposite the rear wall, at least one door, each of the doors comprising an outer edge hinged adjacent a forward edge of a respective one of the sidewalls for movement between an open position, wherein the cassette receiving space is open and accessible, and a closed position wherein the cassette receiving space is closed, a fiber optic cassette receiving rack sized to fit in the cassette receiving space and comprising a pair of opposed elongate guide members arranged in parallel and spaced from one another, wherein a first end of the rack is secured within the cassette receiving space between the top wall and the bottom wall for rotation about an axis between a first position wherein the rack is received entirely within the cassette receiving space and the at least one door is closeable and a second position wherein a second end of the cassette receiving rack is positioned outside the cassette receiving space and the at least one door is open wherein each of the at least one fiber optic cassette is receivable between the opposed guide members.

DETAILED DESCRIPTION OF THE ILLUSTRATIVE EMBODIMENTS

Figure 1:
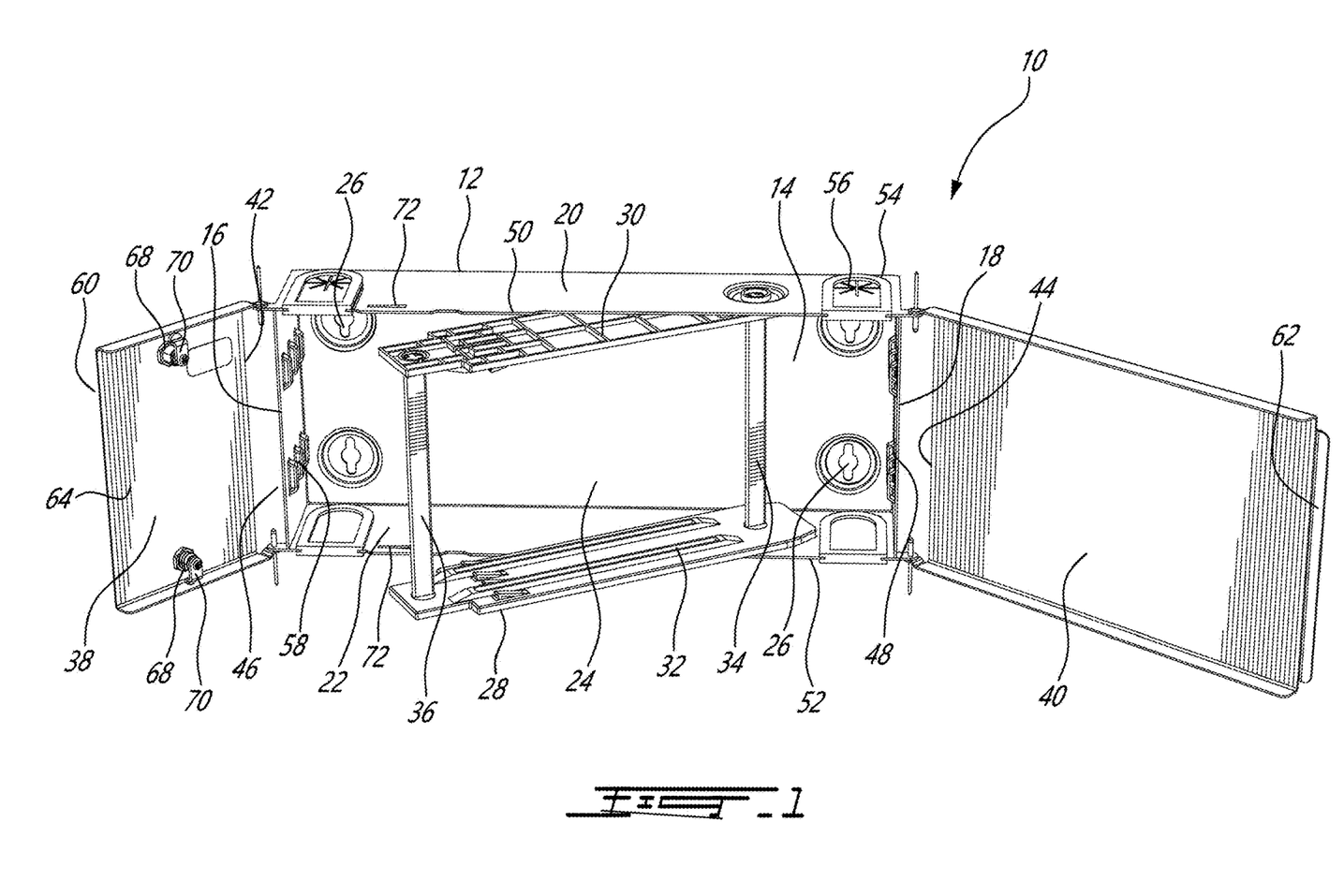
FIG. 1 provides a raised front perspective view of a wallmount enclosure for receiving a pair of like fiber optic cassettes in an open position and in accordance with an illustrative embodiment of the present invention.

Referring now to FIG. 1, a wallmount enclosure for fiber optic cassettes, generally referred to using the reference numeral 10, will now be described. The enclosure comprises a housing 12 comprising a rear wall 14, two opposed side walls 16, 18 and an opposed top wall 20 and bottom wall 22 which together define a cassette receiving space 24. The rear wall 14 comprises features, such as key hole slots 26, which allow the enclosure 10 to be readily mounted to a wall or the like (not shown), for example by using screws (also not shown) or another appropriate type of fastener.

Still referring to FIG. 1, the cassette receiving space 24 is dimensioned to receive a rack 28 for receiving a pair of fiber optic cassettes (not shown). The rack 28 comprises a pair of like guide members 30, 32 positioned opposite one another in a mirrored relationship and interconnected at each end by one of a pair of support members 34, 36. A first end 38 of the rack 28 is mounted within the cassette receiving space 24 between the top wall 20 and the bottom wall 22 for rotation about a first one 34 of the support members and such that the rack 28 can be rotated between a first closed position, where the rack 28 is received entirely within the cassette receiving space 24, and a second open position where a second end of the rack 28 is positioned outside the cassette receiving space 24 and such that, as will be discussed in more detail below, the fiber optic cassettes can be inserted into or removed from the rack 28.

Still referring to FIG. 1, first and second doors 38, 40 are provided. Each door 38, 40 comprises a respective outer hinged edge 42, 44 adjacent a forward edge 46, 48 of a respective on of the sidewalls 16, 18. The doors 38, 40 are hinged for movement between an open position, wherein the cassette receiving space 24 is accessible, and a closed position wherein the doors 38, 40 are positioned in front of the opening defined by the forwards edges 46, 48 of the sidewalls 16, 18, forward edge 50 of the top wall 20 and forward edge 52 of the bottom wall 22.

Figure 2:
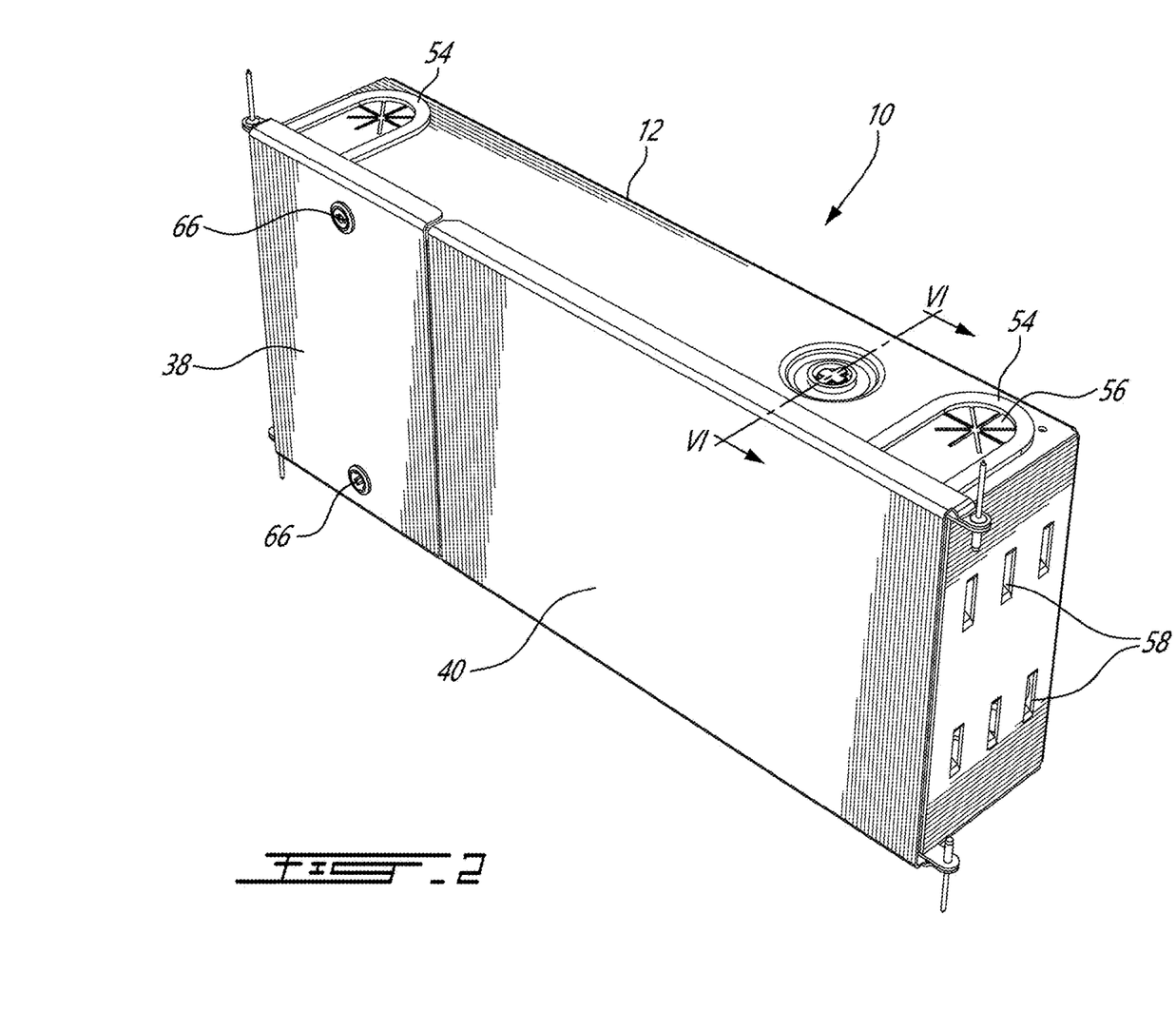
FIG. 2 provides a raised right front perspective view of a wallmount enclosure for receiving a pair of like fiber optic cassettes in a closed position and in accordance with an illustrative embodiment of the present invention.

Referring to FIG. 2 in addition to FIG. 1, the housing 12 further comprises a plurality of cutaways 54 for the running of optic fibers (not shown) or the like in and out of the housing 12 when the doors 38, 40 are in the closed position. The cutaways 54 may be sealed for example by a gasket 56. Other features, such as cable tie downs 58 may also be provided. In order to close the opening of the housing 12 the second door 40 is first moved to the closed position. The first door 38 is then moved to the closed position and such that an inner edge 60 of the first door 38 overlaps an inner edge 62 of the second door 40. In this regard, the inner edge 62 of the second door 40 is profiled to match an inner surface 64 of the inner edge 60 of the first door 38. The first door 38 can be secured in place via one or more locks 66, in turn securing the second door 40 in place and limiting unwanted access to the cassette receiving space 24. In this regard, each lock 66 illustratively comprises cylinder 68 for receiving a key (not shown) which actuates a cam 70 which in turn engaged or disengaged from a respective slot 72 in the housing 12.

Figure 3A:
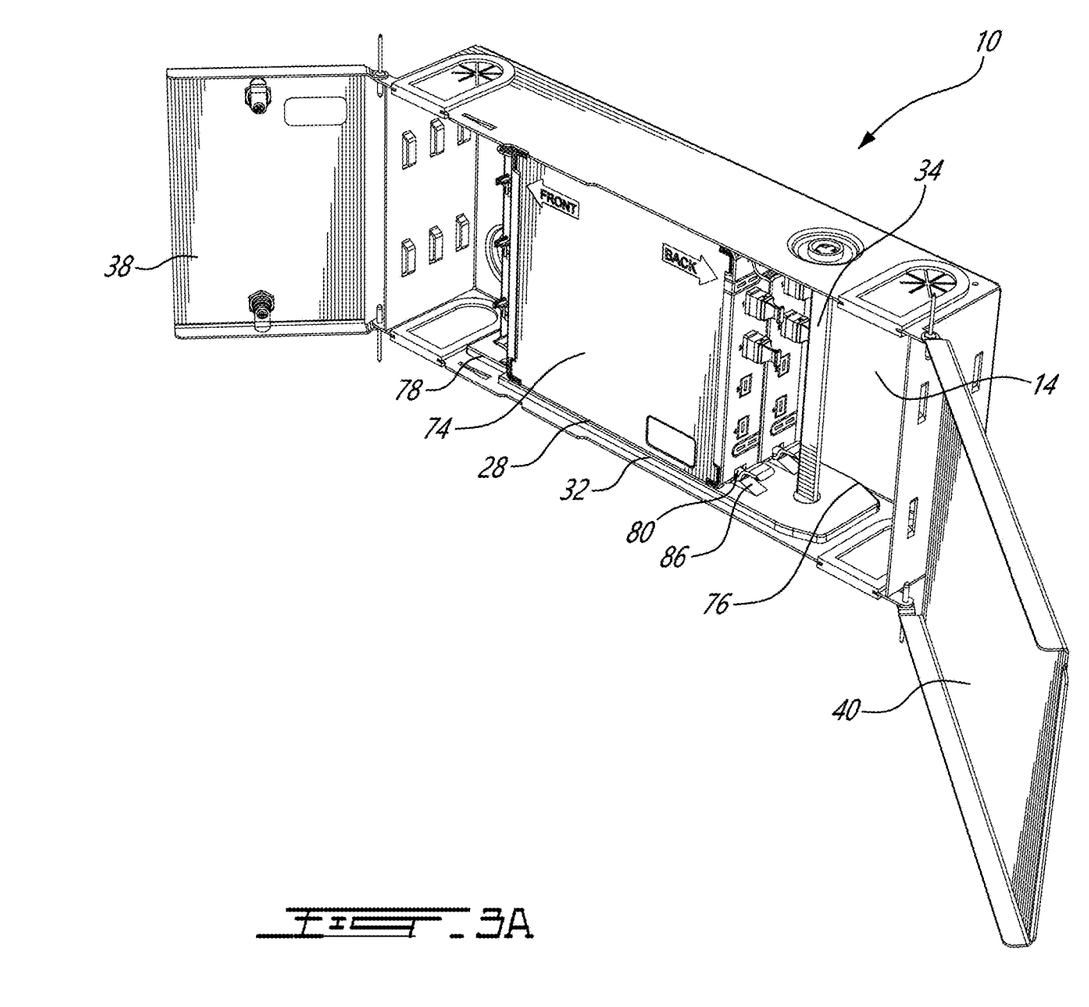
FIG. 3A provides a raised right front perspective view of a wallmount enclosure for receiving a pair of like fiber optic cassettes in an open position with two fiber optic cassettes installed and in accordance with an illustrative embodiment of the present invention.
Figure 3B:
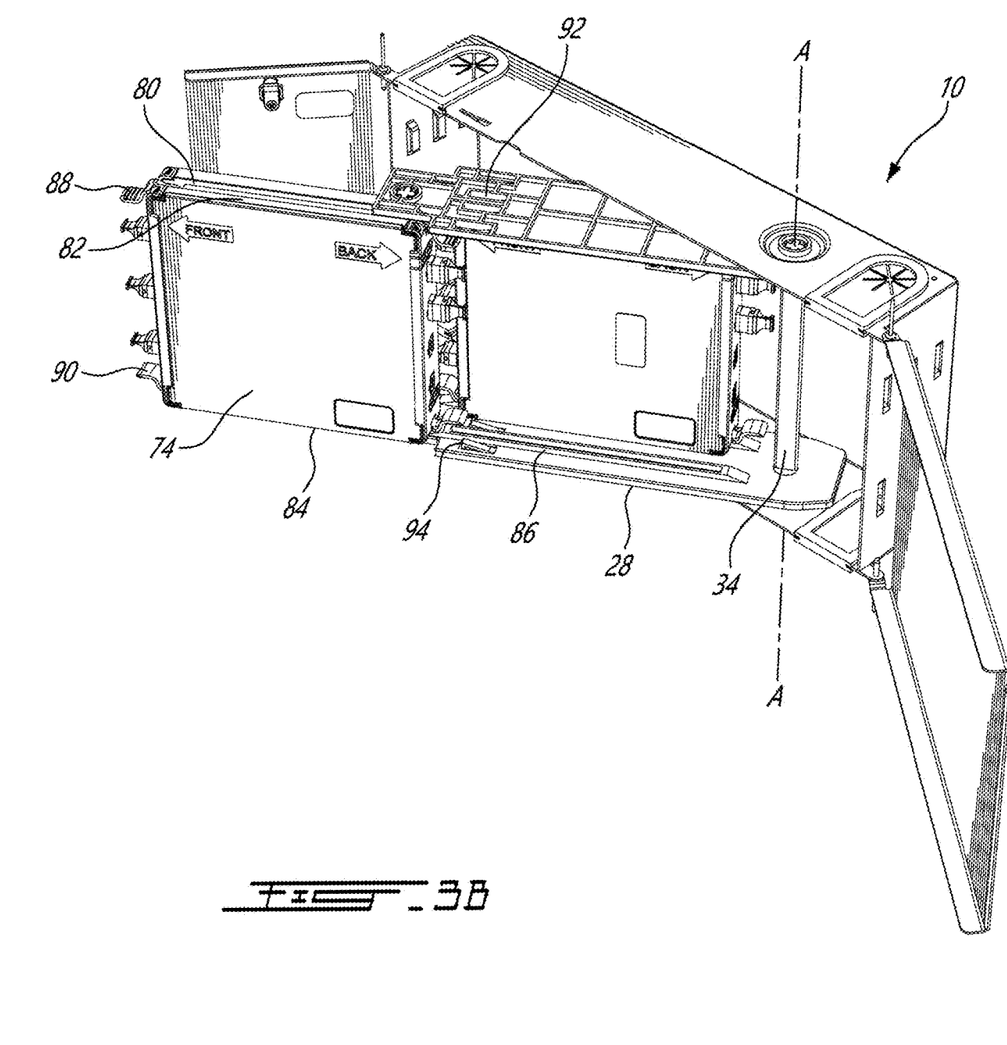
FIG. 3B provides a raised right front perspective view of a wallmount enclosure for receiving a pair of like fiber optic cassettes in an open position with one fiber optic cassette installed and one fiber optic cassette removed and in accordance with an illustrative embodiment of the present invention.

Referring to FIGS. 3A and 3B, as discussed above the rack 28 receives a pair of fiber optic cassettes 74. In order to remove or insert a fiber optic cassette 74 from/into the rack 28, the rack 28 is rotated from the closed position (FIG. 3A) to the open position (FIG. 3B) about an axis (A-A) defined by the first support member 34. In this regard, and with reference to FIG. 4A in addition to FIG. 3B, each guide member 30, 32 comprises a bevelled inner end 76 which engages with the rear wall 14 when the rack 28 is rotated about the first support member 34 thereby limiting travel of the outer end 78 of the guide members 30, 32, and the rack 28, outwards. Provision of the rotatable rack 28 allows relatively long fiber optic cassettes 74 to be readily inserted and removed from the cassette receiving space 24 while still providing for a wallmount enclosure with a limited raised profile.

Figure 4A:
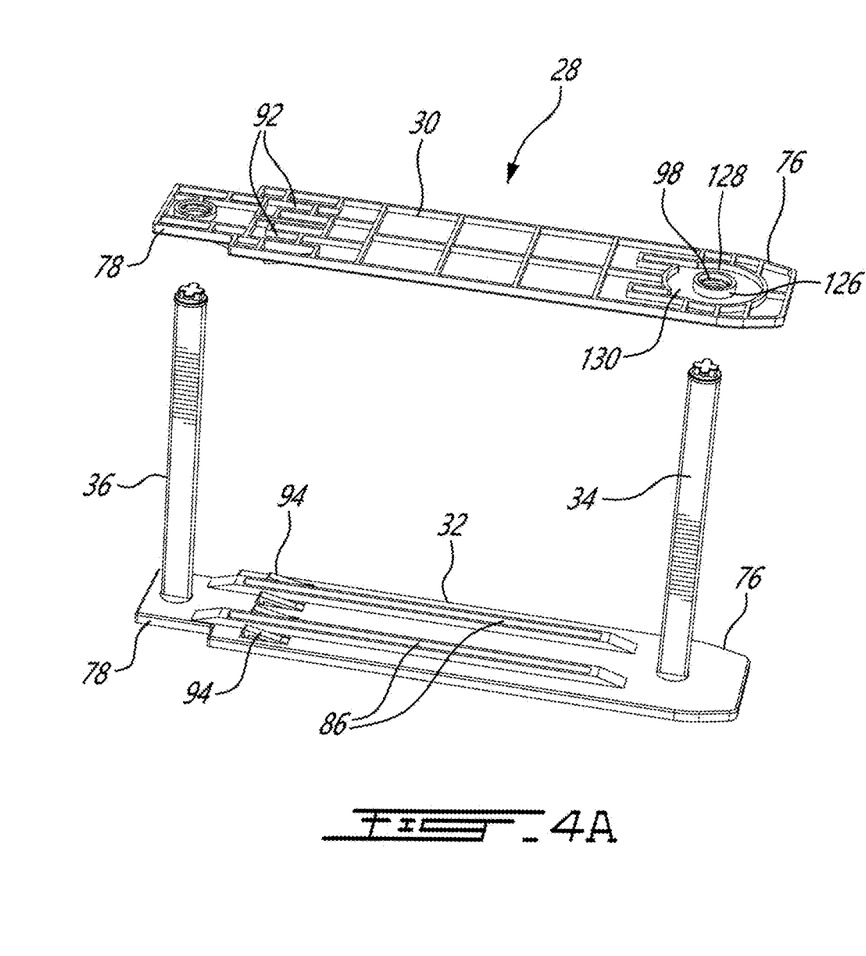
FIG. 4A provides a partially exploded raised right front perspective view of a rack for use in a wallmount enclosure and in accordance with an illustrative embodiment of the present invention.
Figure 5:
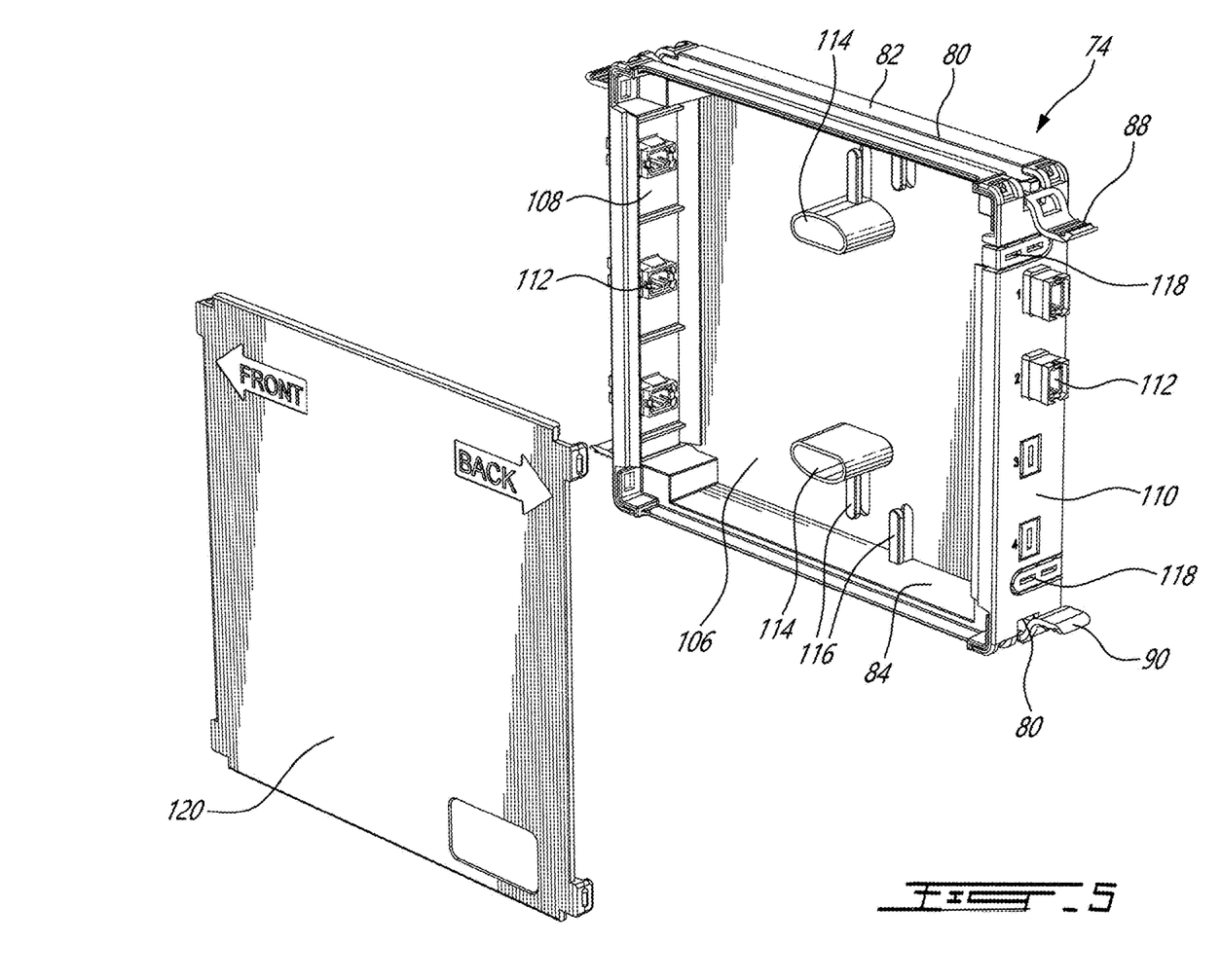
FIG. 5 provides a partially exploded raised right front perspective view of a reversible fiber optic cassette for use in a wallmount enclosure and in accordance with an illustrative embodiment of the present invention.

Referring to FIG. 5 in addition to FIG. 3A, FIG. 3B and FIG. 4A, each cassette 74 comprises a pair of elongate rail receiving grooves 80 one a top side 82 and bottom side 84 thereof. The rail receiving grooves 80 slidingly receive a respective rail 86 in each of the guide members 30, 32. The cassette 74 is slid into the rack 28 and on reaching an installed position a latch 88, 90 in the cassette 74 engages respective tabs 92, 94 in each of the guide members 30, 32 thereby securing the cassette 74 in the rack. With cassettes 74 in the installed position the rack 28 can be returned to the closed position, allowing, for example, the doors 38, 40 to be shut. Of note is that the cassettes 74 are illustratively reversible and may be installed in a back to front direction, or upside down.

Figure 4B:
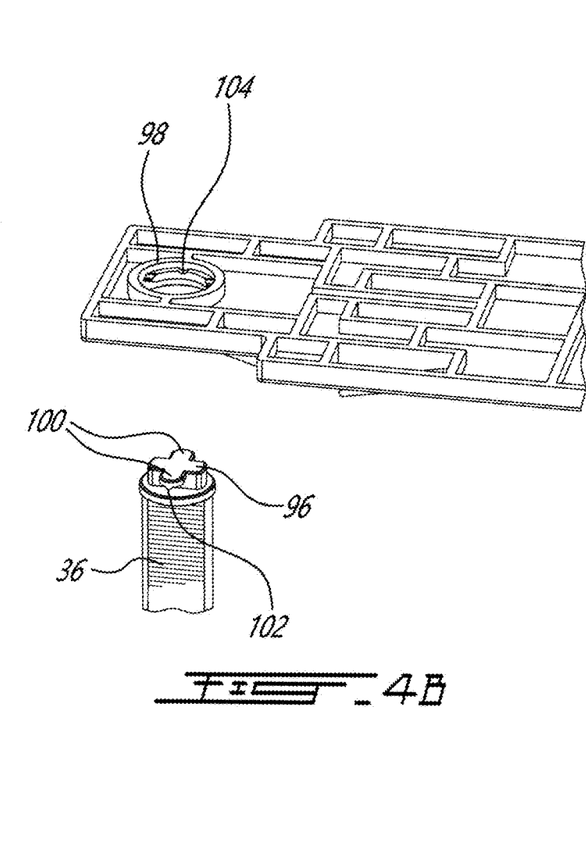
FIG. 4B provides a detailed view of a portion of the rack in FIG. 4A.

Referring now to FIG. 4B in addition to FIG. 4A, as discussed above the rack 28 is comprised of the pair of spaced guide members 30, 32 interconnected towards either end by respective ones of the pair of support members 34, 36. In order to assembled the rack 28 from the spaced guide members 30, 32 and the pair of support members 34, 36, each end 96 of the support members 34, 36 is inserted into respective apertures 98 formed in the guide members 30, 32 and rotated 90 degrees. Each end of the support members 34, 36 comprises a pair of flexible tabs 100 each comprising a boss 102 which engages with a respective boss receiving feature 104 formed in the apertures 98. In this manner, each end 96 is held securely in a mechanical interlock within its respective aperture 98.

Referring back to FIG. 5, each fiber optic cassette 74 comprises a housing 106 for receiving a plurality of optic fibers (not shown) which interconnect one or more optic fibers terminated on a first face 108 of the fiber optic cassette 74 with one or more optic fibers terminated on a second face 110 of the fiber optic cassette 74. In this regard, a plurality of adaptors 112 can be provided which illustratively receive a standardised optic fiber cable plug, such as an LC type fiber optic plug (not shown). Features such as cable supports 114 around which fiber optic cables can be wound or cable tie downs 116 may also be provided to facilitate arrangement of optic fibers within the cassette 74. Additionally, one or more break away portions 118 may provided allowing for one or more optic fibers to exit the housing. The fiber optic cassette 74 further comprises a removable cover 120 to simplify access to the inside of the housing 106.

Figure 6:
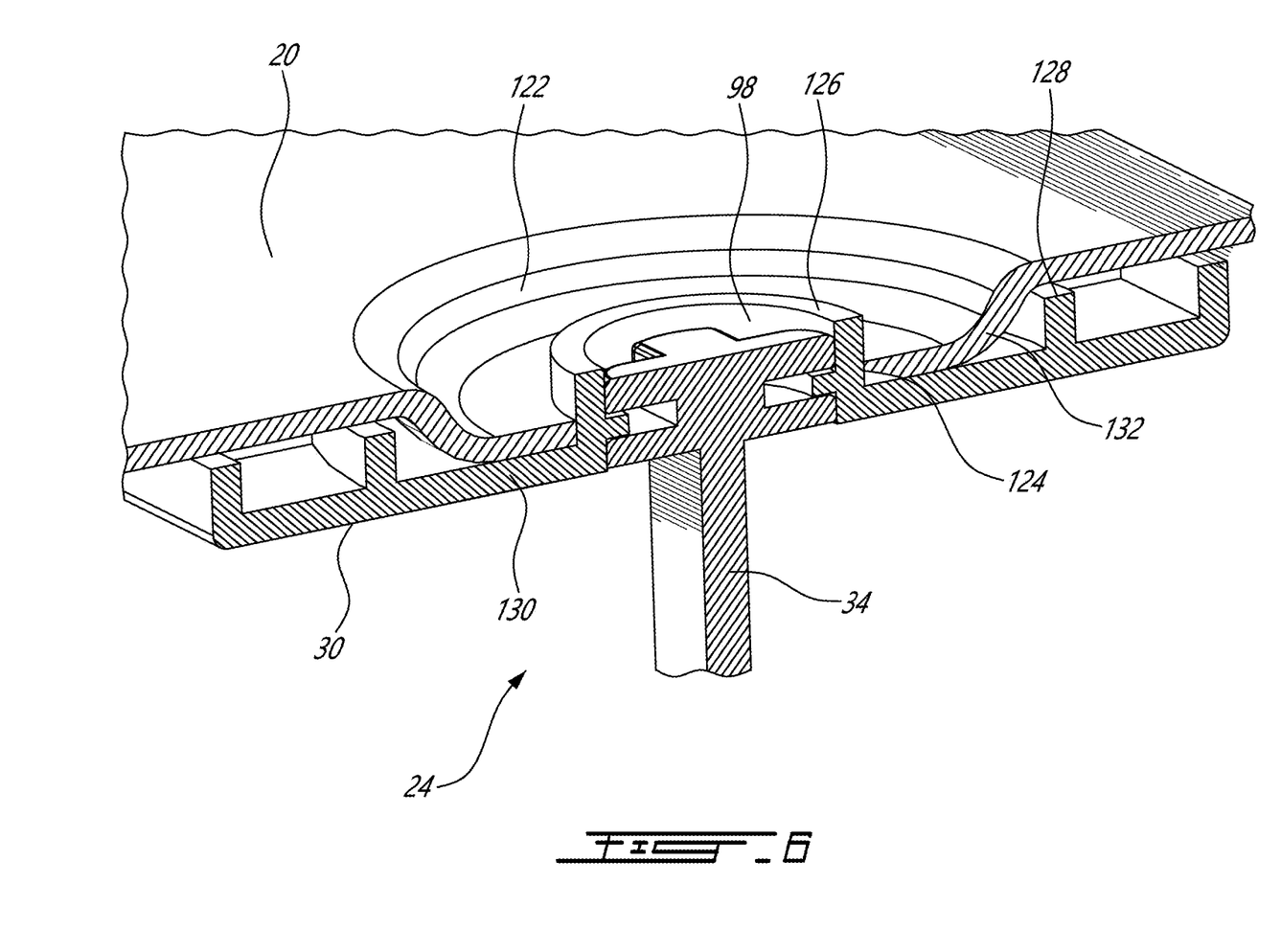
FIG. 6 provides a sectional view along line VI-VI in FIG. 2.

Referring now to FIG. 6 in addition to FIG. 4A, a circular boss 122 is formed in each of the top wall 20 and bottom wall 22, opposite one another and extending into the cassette receiving space 24. Each circular boss defines an opening 124 which is dimensioned for snugly receiving for rotation an inner raised ring 126 surrounding the respective aperture 98 of the guide member 30, 32. A second outer raised ring 128 and the first raised ring 126 together define an annular space 130 into which the circular bosses 122 are received. The raised bosses 122 provide clearance such that the spaced guide members 30, 32, and therefore the rack 28, can swing freely between the closed position and the open position, and without interference from the top wall 20 or the bottom wall 22. Additionally, the outer raised ring 128 can engage as necessary with a shoulder 132 of the respective raised boss 122 and such that the rack 28 is stabilised versus the housing 12.

Figure 7A:
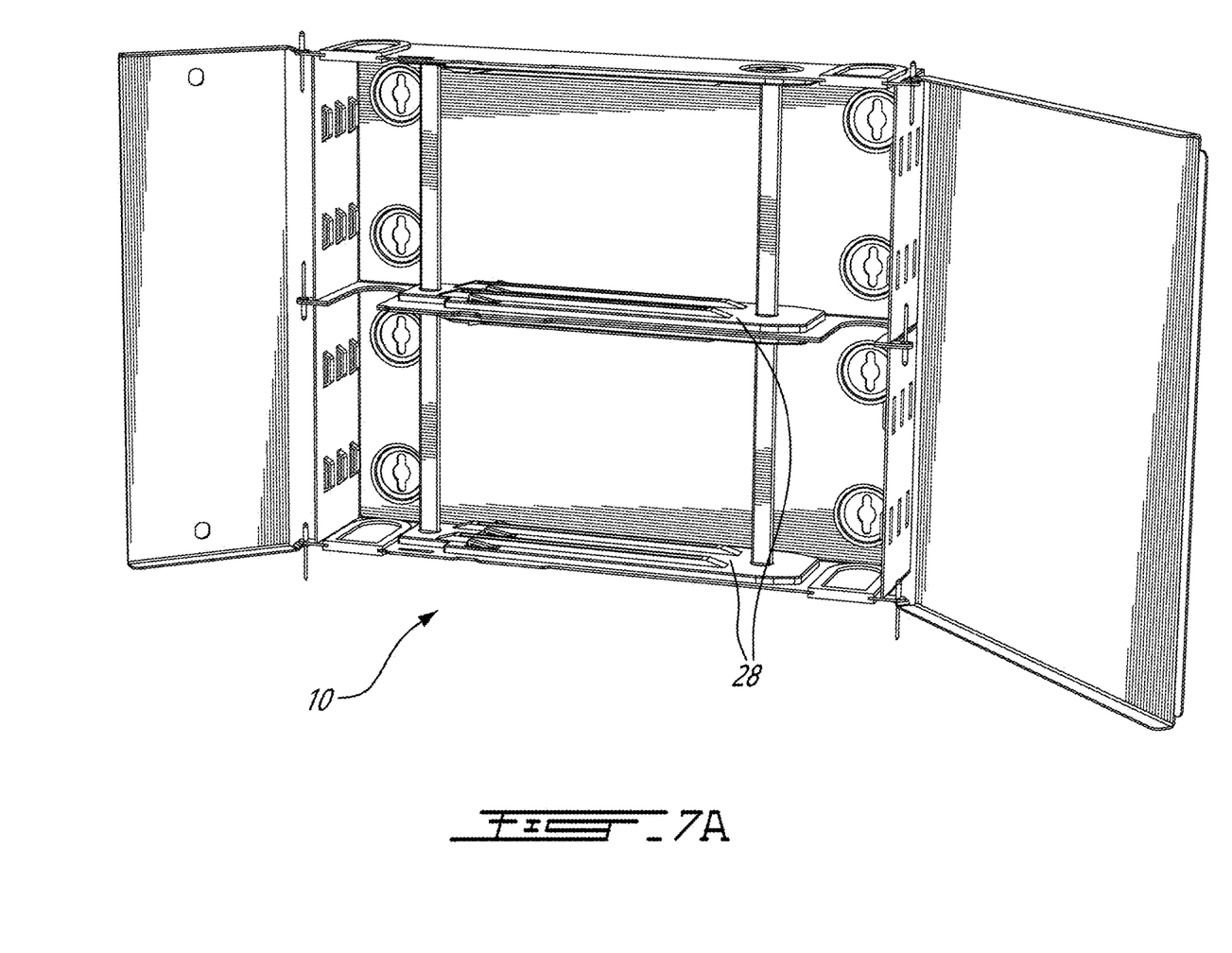
FIGS. 7A and B proved raised right front perspective views of wallmount enclosures in accordance respectively with first and second alternative embodiments of the present invention.
Figure 7B:
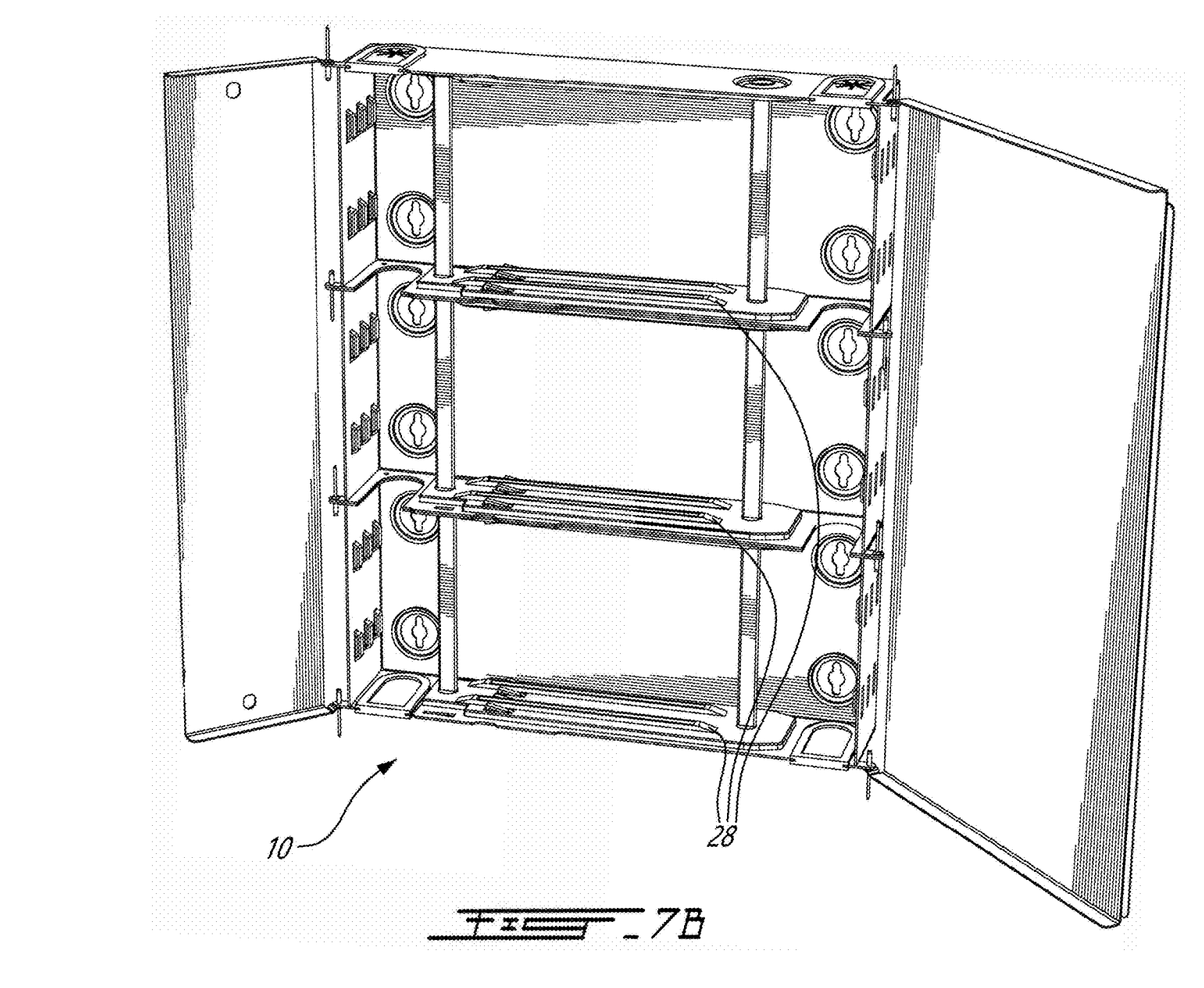

Referring now to FIG. 7A, in a first alternative embodiment the wallmount enclosure 10 can be configured to receive to receive two (2) racks 28 in a stacked arrangement. The racks 28 are illustratively independently rotatable between the closed position and the open position. Similarly, in a second alternative illustrative embodiment as illustrated in FIG. 7B, the wallmount enclosure 10 can be configured to receive to receive three (3) racks 28 in a stacked arrangement. Again, the racks 28 in the second alternative embodiment are illustratively independently rotatable between the closed position and the open position.

Figure 8A:
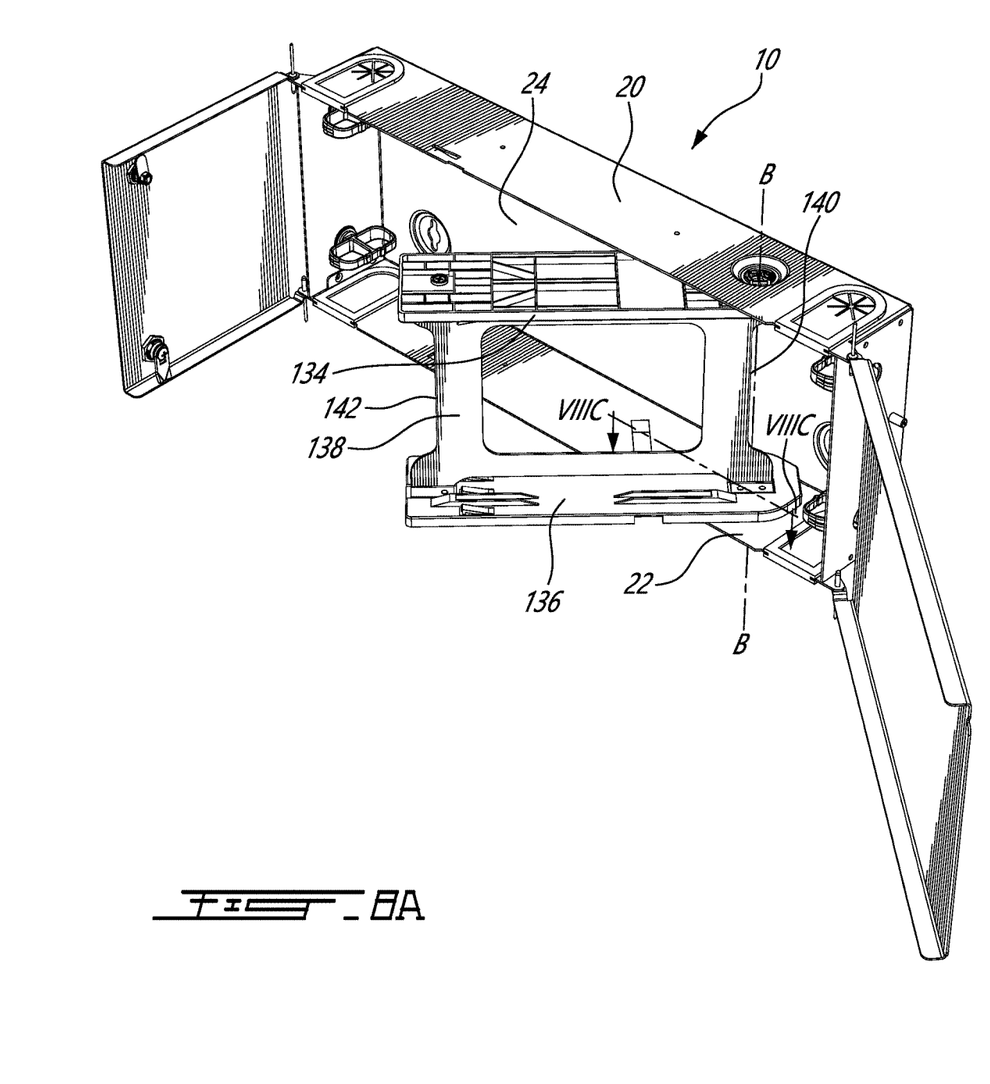
FIG. 8A provides a raised right perspective view of a wallmount enclosure for receiving a pair of like fiber optic cassettes in an open position and in accordance with a third illustrative embodiment of the present invention.
Figure 8B:
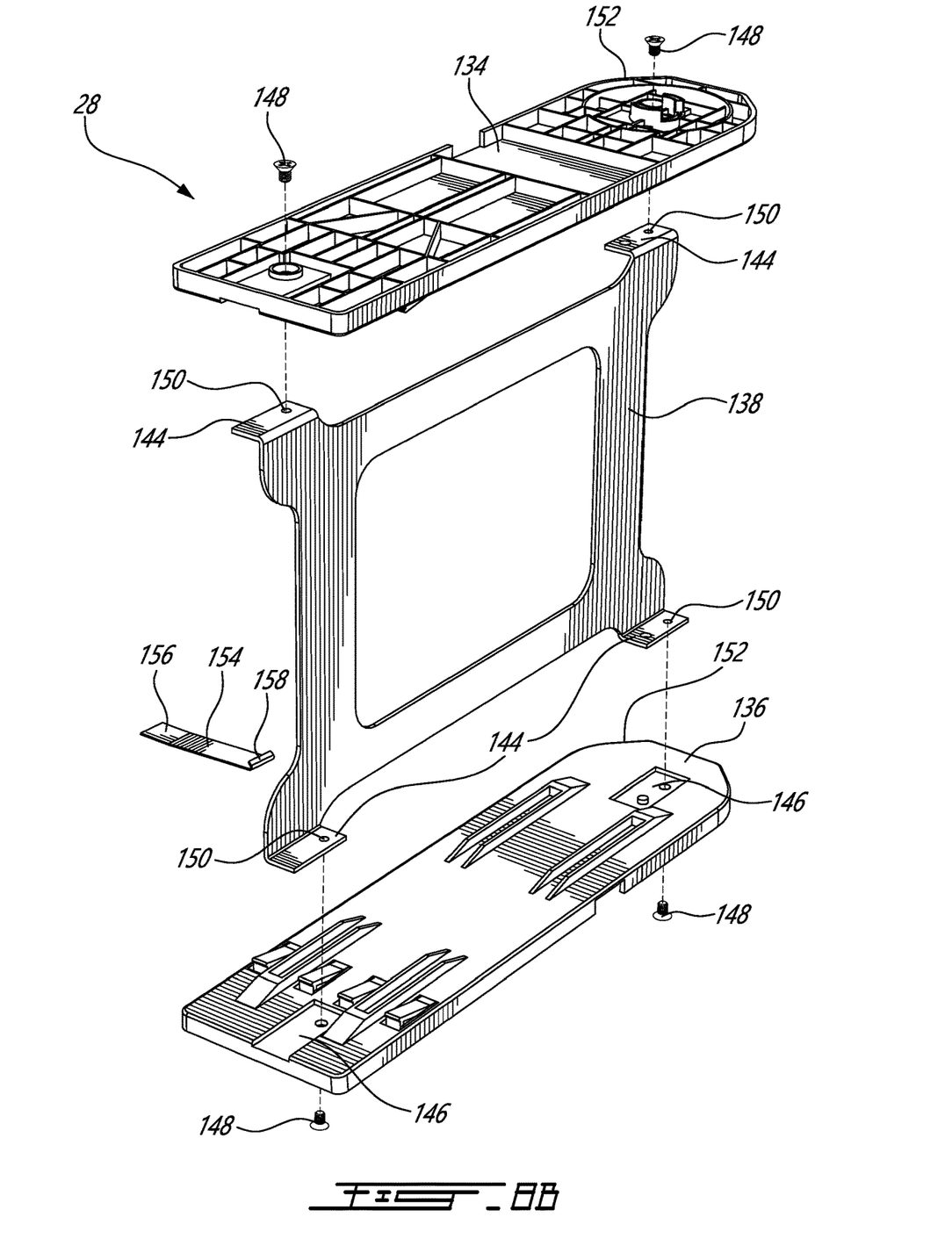
FIG. 8B provides an exploded view of a rack for use in a wallmount enclosure and in accordance with a third illustrative embodiment of the present invention.

Referring now to FIGS. 8A and 8B, in a third alternative embodiment the wall mount enclosure 10 comprises a rack 28, again for receiving a pair of fiber optic cassettes (not shown), and comprising a pair of like guide members 134, 136 positioned opposite one another in a mirrored relationship and interconnected by a substantially flat separator 138, fabricated from a rigid material such as sheet metal or the like. A first end 140 of the rack 28 is mounted within the cassette receiving space 24 between the top wall 20 and the bottom wall 22 for rotation about an axis B-B towards the first end 140 of the rack 28 and such that the rack 28 can be rotated between a first closed position, where the rack 28 is received entirely within the cassette receiving space 24, and a second open position where a second end 142 of the rack 28 is positioned outside the cassette receiving space 24 and such that the fiber optic cassettes can be inserted into or removed from the rack 28.

Still referring to FIGS. 8A and 8B, the separator 138 comprises a plurality of feet 144 which are received within respective indentations 146 in the guide members 134, 136.

Each of the feet 144 is secured within its respective indentation 146 by a fastener 148 such as screws or the like which is engaged in a respective threaded bore 150.

Figure 8C:
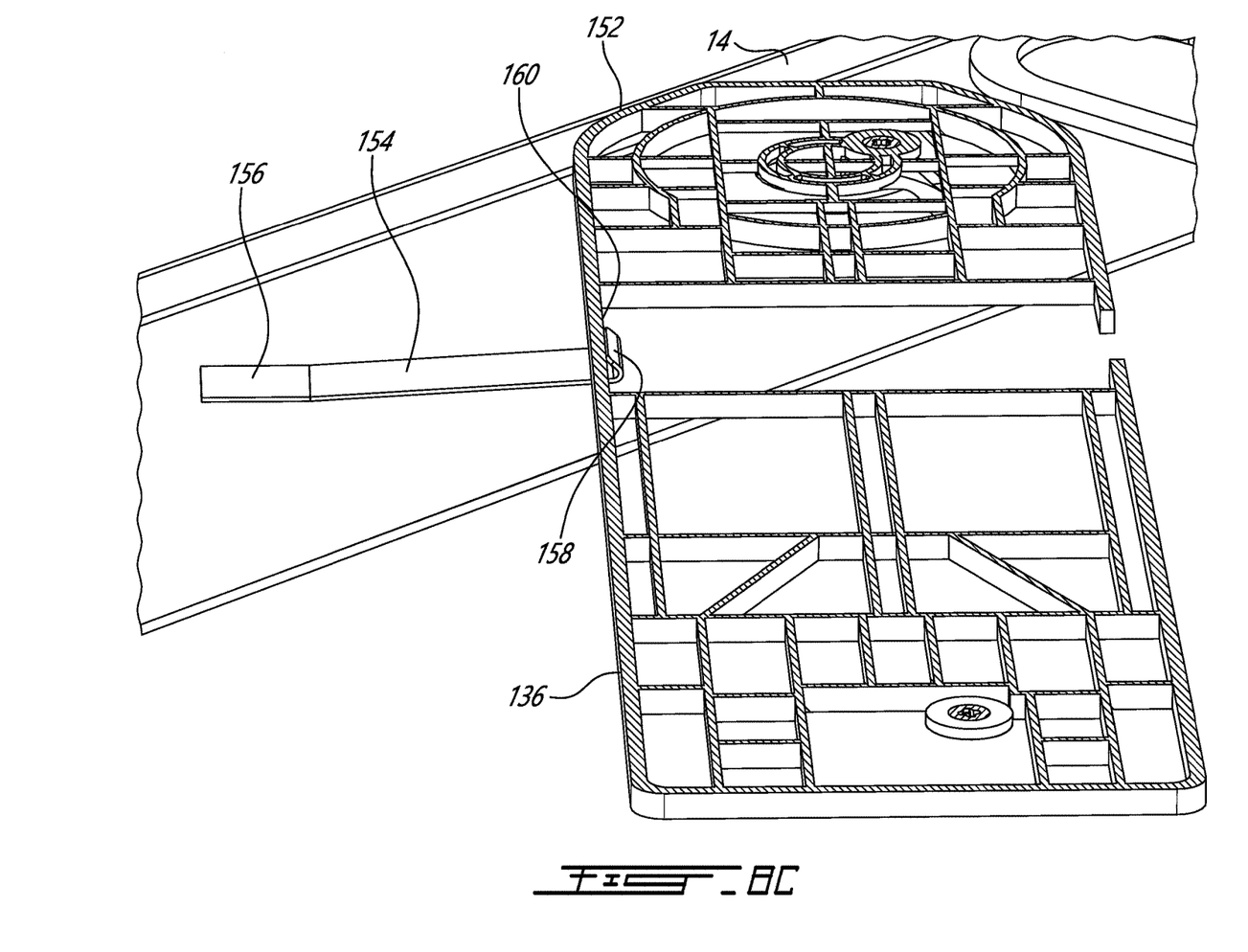
FIG. 8C provides a sectional view along VIIIC-VIIIC in FIG. 8A.

Referring to FIG. 8C in addition to FIGS. 8A and 8B, in order to remove or insert a fiber optic cassette (not shown) into the rack 28, the rack 28 is rotated from the closed position to the open position about the axis (B-B). In this regard, each guide member 134, 136 comprises a bevelled inner end 152 which engages with the rear wall 14 when the rack 28 is rotated about the axis B-B. Additionally, travel of the rack outward is limited by a plate 154 which is secured at a first end 156 to the bottom wall 22 and comprises a hooked second end 158. As the rack 28 is rotated outward the hooked end 158 engages the underside 160 of the lower guide member 136. The plate 154 is illustratively manufactured from metal and is secured to the bottom wall 22 by a tack weld or a rivet or the like. Additionally the plate 154 is spring like and is biased such that the hook end presses upwards, for example against the underside of the underside 160 of the lower guide member 136.

Figure 9:
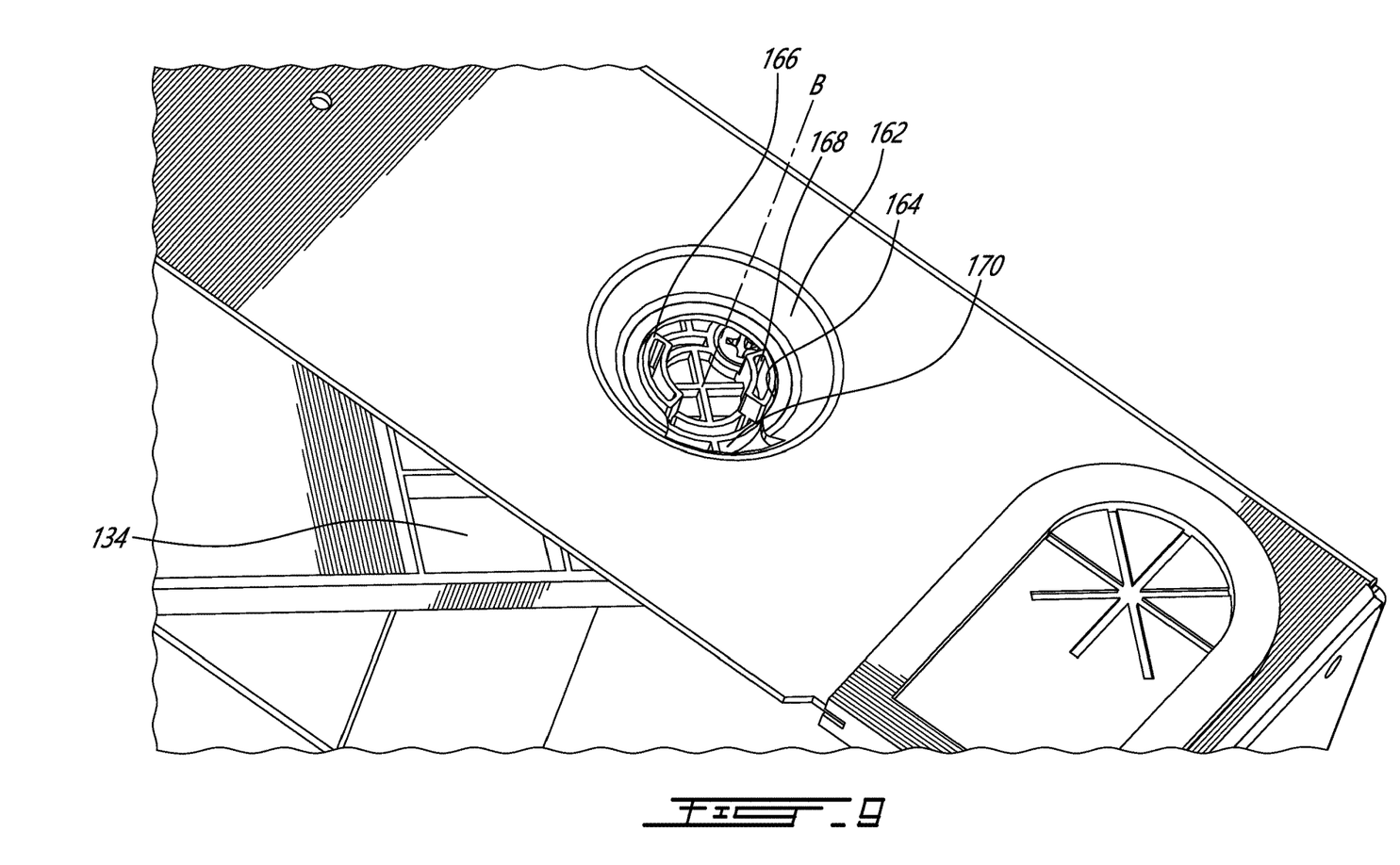
FIG. 9 provides a detailed view of an interconnection between rack and housing of a wallmount enclosure in accordance with a third illustrative embodiment of the present invention.

Referring to FIG. 9, a circular boss 162 is formed in each of the top wall 20 and bottom wall 22, opposite one another and extending into the cassette receiving space 24. Each circular boss 162 defines an opening 164 which is dimensioned for receiving features 166, 168 in each of the guide members 134, 136 and about which the rack 28 can rotate. A slot 170 is provided in each circular boss 162 allowing the features 166, 168 to be inserted into the opening 164 during assembly. In this regard, the opening is positioned such that the features 166, 168 may only be inserted into the opening 164 via the slot 170 when the rack 28 is outside of it normal range of rotation (illustratively at an angle of 135 degrees from the closed position). Rotation of the rack 28 following insertion of the features 166, 168 into the opening secured the features into the opening, thereby ensuring that the rack 28 may rotate within its normal range. Additionally, the raised bosses 162 provide clearance such that the spaced guide members 134, 136, and therefore the rack 28, can swing freely between the closed position and the open position about the axis B-B, and without interference from the top wall 20 or the bottom wall 22.

Although the present invention has been described hereinabove by way of specific embodiments thereof, it can be modified, without departing from the spirit and nature of the subject invention as defined in the appended claims.

The invention claimed is:

1. A wallmount enclosure for receiving at least one fiber optic cassette, the enclosure comprising:
    a housing comprising a cassette receiving space defined by a rear wall and a top wall, a bottom wall opposite said top wall and a pair of opposed sidewalls positioned between said top wall and said bottom wall, respective forwards edges of said top wall, bottom wall and sidewalls defining an opening to said cassette receiving space opposite said rear wall;
    at least one door, each of said doors comprising an outer edge hinged adjacent a forward edge of a respective one of said sidewalls for movement between an open position, wherein said cassette receiving space is open and accessible, and a closed position wherein said cassette receiving space is closed;
    a fiber optic cassette receiving rack sized to fit in said cassette receiving space and comprising a pair of opposed elongate guide members arranged in parallel and spaced from one another, wherein a first end of said rack is secured within said cassette receiving space between said top wall and said bottom wall for rotation about an axis between a first position wherein said rack is received entirely within said cassette receiving space and said at least one door is closeable and a second position wherein a second end of said cassette receiving rack is positioned outside said cassette receiving space and said at least one door is open;
    wherein each of the at least one fiber optic cassette is receivable between said opposed guide members.

2. The wallmount enclosure of claim 1, wherein each of said elongate guide members comprises at least one rail arranged in parallel along a length thereof, wherein each of said at least one rail of a first of said guide members is arranged opposite a respective rail of a second of said guide members and further wherein each cassette comprises a pair of elongate rail receiving grooves, a first groove along a top side thereof and a second groove along a bottom side thereof and wherein each of the at least one fiber optic cassette is receivable between respective opposed pairs of said rails.

3. The wallmount enclosure of claim 2, wherein said rack is for receiving a like pair of the at least one fiber optic cassette, wherein each of said elongate guide members comprises a pair of said at least one rail, one of said rails on either side of a guide member center, and wherein each of the pair of the least one fiber optic cassette is receivable between respective opposed pairs of said rails.

4. The wallmount enclosure of claim 1, wherein a depth of said cassette receiving space is less than a height of said cassette receiving space and a length of said cassette receiving space.

5. The wallmount enclosure of claim 1, further comprising a pair of said doors wherein in said closed position each of said pair of doors is positioned in front of said opening and inner edges of each of said doors are arranged immediately adjacent one another.

6. The wallmount enclosure of claim 1, further a locking mechanism for releasably securing said at least one door in said closed position.

7. The wallmount enclosure of claim 1, wherein said opposed elongate guide members are interconnected at either end by respective ones of a pair of elongate support members and wherein said axis is concentric with a first of said pair of elongate support members.

8. The wallmount enclosure of claim 1, wherein said rear wall comprises a plurality of key hole slots for mounting the wallmount enclosure to a vertical surface.

9. The wallmount enclosure of claim 1, comprising a plurality of said fiber optic cassette receiving racks, wherein a first of said racks is positioned above a second of said racks.

10. The wallmount enclosure of claim 9, wherein said first of said racks is rotatable independently of said second of said racks.

11. The wallmount enclosure of claim 10, wherein each of said racks is for receiving a like pair of the at least one fiber optic cassette.

* * * * *